United States Patent [19]

Anthony

[11] Patent Number: 5,331,817
[45] Date of Patent: Jul. 26, 1994

[54] PORTABLE SELF-COOLING AND SELF-HEATING DEVICE FOR FOOD AND BEVERAGE CONTAINERS

[75] Inventor: Michael Anthony, Boca Raton, Fla.

[73] Assignee: The Joseph Company, Los Angeles, Calif.

[21] Appl. No.: 69,985

[22] Filed: May 28, 1993

[51] Int. Cl.⁵ .................................. F25B 9/02
[52] U.S. Cl. .......................... 62/5; 62/293; 62/371
[58] Field of Search ........................ 62/5, 293, 371

[56] References Cited

U.S. PATENT DOCUMENTS

| | | | |
|---|---|---|---|
| 3,074,243 | 1/1963 | Tilden | 62/5 |
| 3,144,754 | 8/1964 | Tilden | 62/5 |
| 3,525,236 | 8/1970 | Solhkhah | 62/294 |
| 3,636,726 | 1/1972 | Rosenfeld et al. | 62/294 |
| 3,654,768 | 4/1972 | Inglis et al. | 62/5 |
| 3,786,643 | 1/1974 | Anderson et al. | 62/5 |
| 4,640,102 | 2/1987 | Tenenbaum et al. | 62/294 |
| 4,656,838 | 4/1987 | Shen | 62/294 |
| 4,736,599 | 4/1988 | Siegel | 62/294 |
| 5,010,736 | 4/1991 | York et al. | 62/5 |
| 5,201,183 | 4/1993 | Ramos | 62/4 |

Primary Examiner—William E. Tapolcai
Attorney, Agent, or Firm—Thompson, Hine and Flory

[57] ABSTRACT

A portable, self contained heating or cooling apparatus for a beverage can is disclosed. A vortex tube is provided which supplies the needed heating or cooling effect to the beverage in the can.

16 Claims, 4 Drawing Sheets

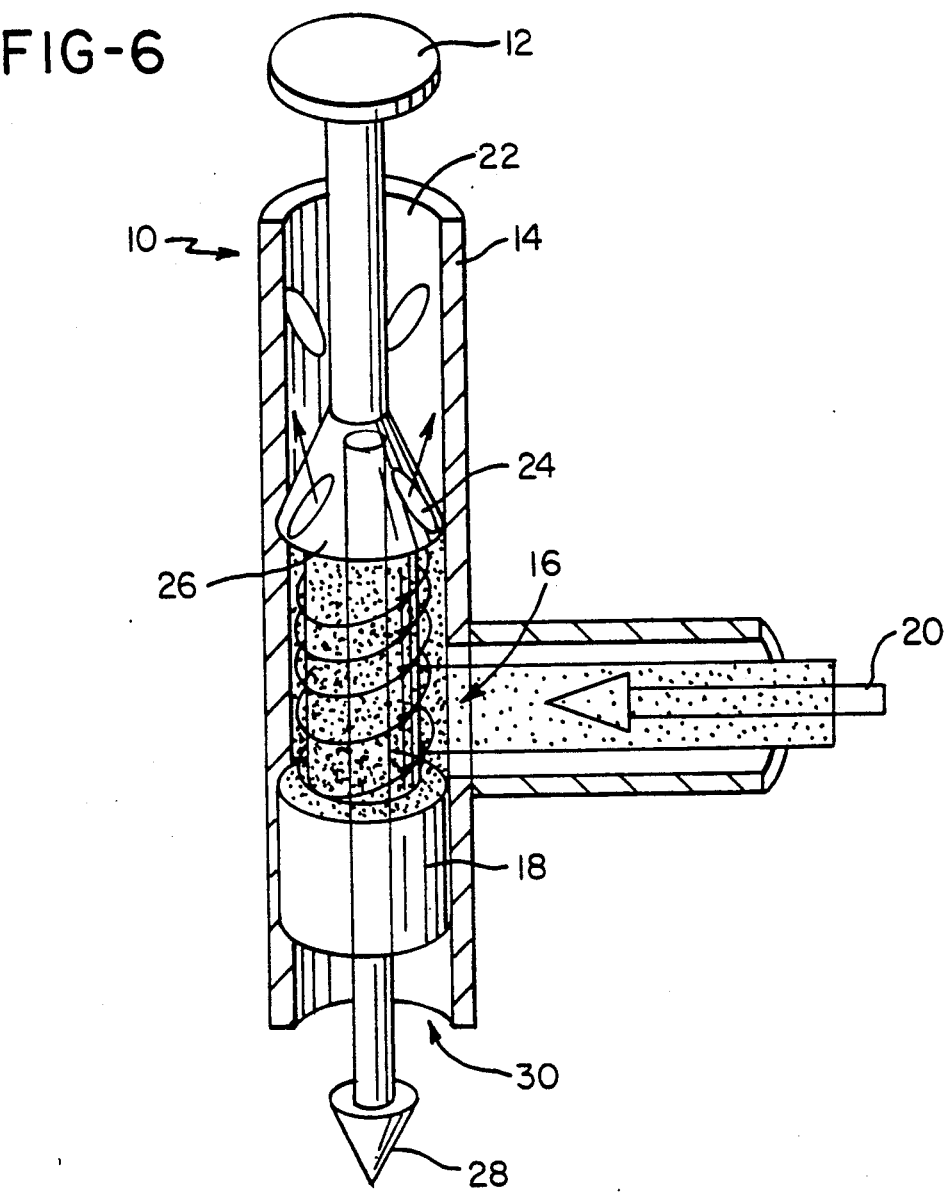

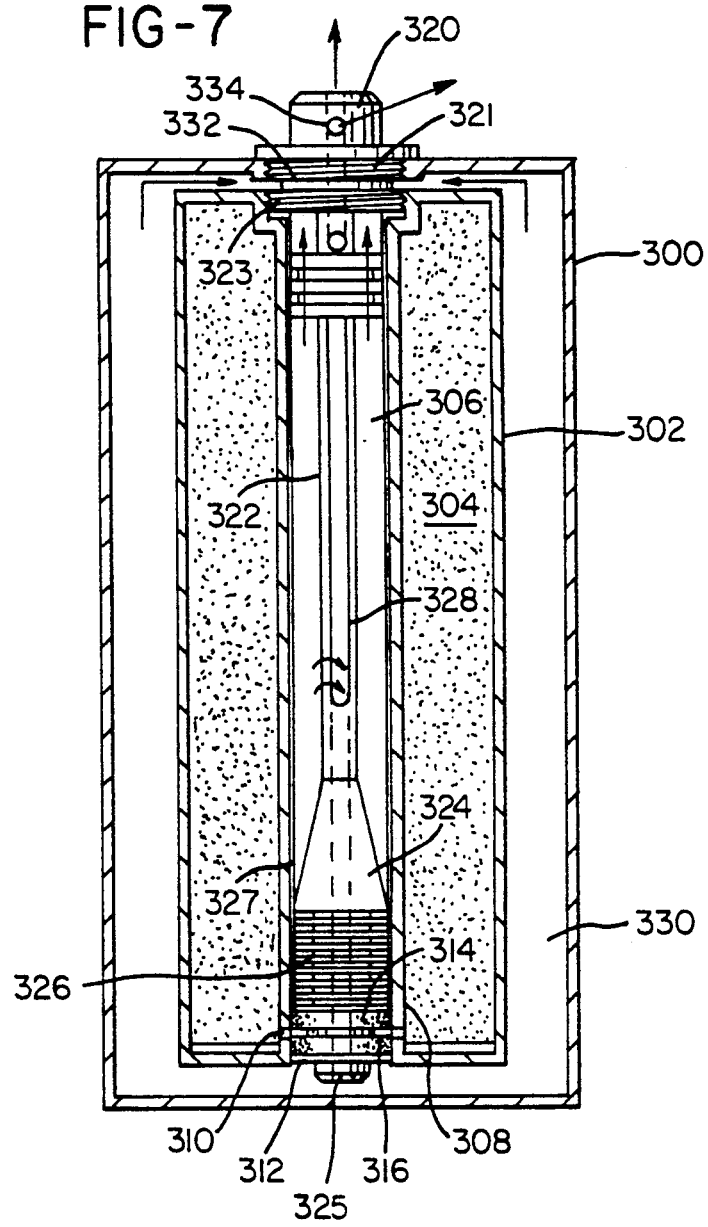

PORTABLE SELF-COOLING AND SELF-HEATING DEVICE FOR FOOD AND BEVERAGE CONTAINERS

FIELD OF THE INVENTION

This invention relates to temperature changing devices and in particular to portable or disposable food or beverage coolers and heaters.

BACKGROUND OF THE INVENTION

There are a number of devices used for chilling or heating containers of food products, beverages, and biomedical products. These devices fall into four distinct groups.

The first group consists of devices using endothermic or exothermic chemical reactions for producing a chilling effect or a heating effect respectively. The second group relates to chilling devices only and generally consists of devices whose principle of operation is based on evaporative processes only. The third group of devices is based on desiccant absorbing agents in combination with evaporative processes to achieve a cooling or heating effect. The fourth group of devices use electricity to produce the cooling or heating effect by thermoelectric cooling or resistive heating respectively.

The first group of devices generally requires two or more chemicals to be combined quickly to produce an endothermic or exothermic reaction. An example of an endothermic type chiller is the ICE PACK. The ice pack is a product that uses ammonium nitrate and water to absorb heat rapidly for emergency cooling in medical applications. Several devices depend on similar endothermic reactions to produce a chilling effect that can be put to effective use for commercialization.

The second group of devices generally relate to chilling devices. The household refrigerator belongs to this group of devices. The refrigeration effect occurs when a compressed and liquified gas is expanded through a small tube. The evaporation of the liquified gas to a gaseous state causes considerable heat to be absorbed through the walls of the expansion tube, thereby producing a refrigeration effect.

The third group of devices use desiccant absorbing agents and water. Typically, a water gel is smeared on the inside walls of a first sealed and evacuated chamber. A second sealed chamber contains a desiccant that absorbs the water vapor. By opening a small passage way between the first chamber and the second chamber, rapid vaporization of the water in the first chamber occurs, resulting in cooling. The absorbing desiccant usually heats up to a high temperature due to the heat of condensation of water vapor removed from the first chamber. Both a heating and cooling effect may be obtained by this method.

The fourth group of devices relies on well-known electrical effects for both heating and cooling.

The devices described by these four groups can be used for a variety of applications. However, time has proved that the above devices cannot adequately address the needs for cooling or heating a self-contained beverage or food container. Devices of the first group (chemical endothermic and exothermic reactions) generally rely on toxic and environmentally unfriendly chemicals. They have not been successfully used in the commercial applications for either the food or the beverage industries. Devices of the second group require very bulky pneumatic circuits, and cannot economically be used in small containers such as beverage cans or food cans. Devices of the third group have been applied in some food and beverage applications but only under expensive research programs. Even so such devices still do not appear to hold any promise of commercialization due to the expensive designs involved and the toxic nature of the chemical desiccants involved.

Vortex tubes have been used in cooling systems and are well known in the art. Sometimes they are also referred to as Hilsch tubes. A vortex tube is a device which, when fed with compressed air, emits a stream of cold air from one end and a stream of hot air from the other end. In operation, compressed air enters nozzles in the vortex tube which inject it tangentially into a vortex generation chamber. The vortex so generated, moves through the tube. The swirling air near the inner surface of the tube becomes hot. The tube is designed to cause a back pressure in the tube which forces some of the air to the center of the tube. This air becomes very cold. Typical vortex tubes are illustrated in U.S. Pat. Nos. 3,173,273 and 3,208,229 to Fulton, U.S. Pat. No. 3,654,768 to Inglis et al., and U.S. Pat. No. 3,786,643 to Anderson et al.

U.S. Pat. Nos. 3,074,243 and 3,144,754 to Tilden disclose a water cooling system for use on diesel locomotives which employs a vortex tube in chilling the water. Locomotives have an abundance of compressed air for use in the braking system and in other areas. The vortex tube is fed with compressed air and the cold air generated is passed through cooling coils around the water vessel.

SUMMARY OF THE INVENTION

It is the object of this invention to provide a simple and effective and safe device that may be housed within a beverage or food container for the purpose of cooling or heating the food or beverage in the container on demand. An additional objective of this invention is to provide a portable, self-contained heating or cooling device that may be used alternatively or simultaneously for heating and/or cooling applications. In the latter case, such a device may be used in a carry food pack containing both cold and hot sections that simultaneously need to be utilized on demand. Other objectives of this invention will become apparent from the appended drawings and the following detailed description of the invention.

BRIEF DESCRIPTION OF THE DRAWINGS

FIG. 6 is a schematic illustration of the vortex effect which is employed in the invention.

FIG. 7 is a cross-sectional schematic illustration of a heat exchange canister for cooling in accordance with another embodiment of the invention.

DETAILED DESCRIPTION OF THE INVENTION

Figure 1:
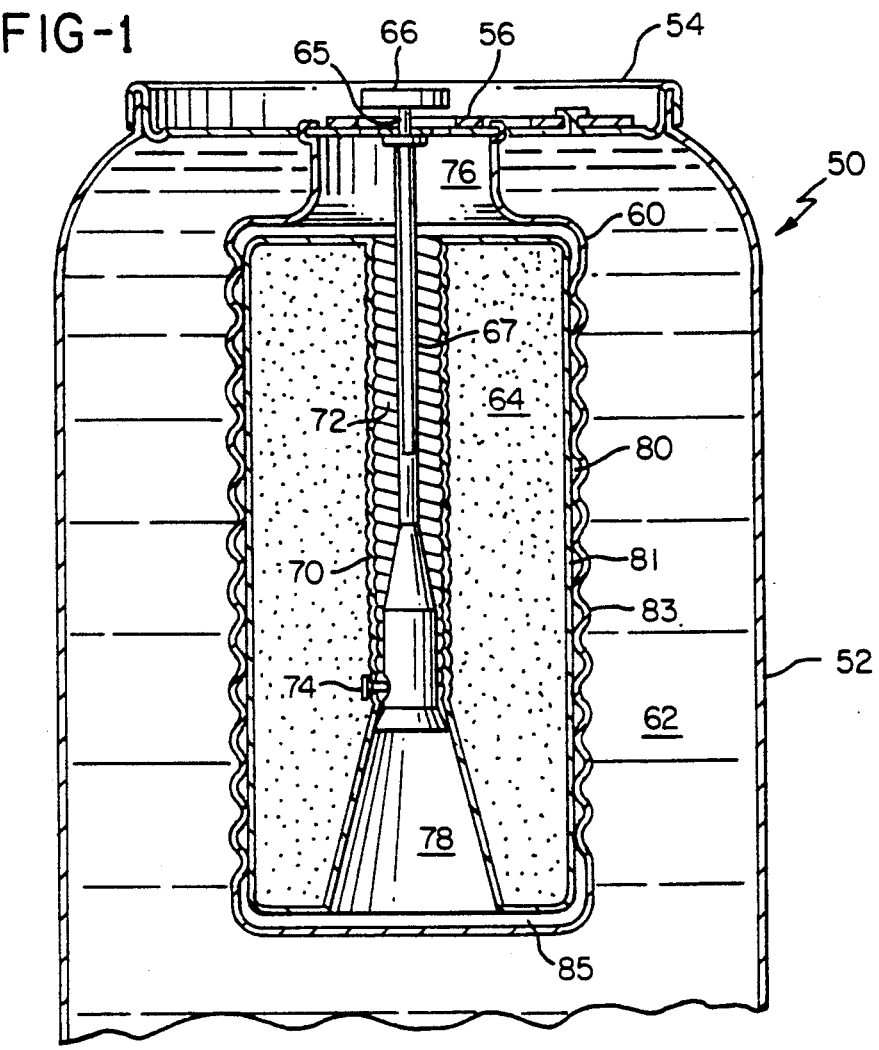
FIG. 1 is a cross-section schematic illustration of a self-chilling beverage can in accordance with one embodiment of the present invention.

The device of this invention is a portable self-contained heater/cooler particularly suitable for beverage and food containers. If a high velocity blast of air is directed tangentially into a pipe, the flow in the pipe becomes rotational. The vortex effect occurs when layers of gas adjacent the axis of rotation are cooled by tens of degrees, while outer layers become substantially heated. The heat from the central axis of the rotating gas is transferred to the outer layers at the boundary of the pipe. This effect is well known in physics and is referred to as vortex cooling.

The effect of vortex cooling and the effect of the expanding gas can be applied cheaply and effectively to the cooling of foods and beverages without posing any danger to the environment.

The first theory of the vortex effect explains the vortex phenomena by kinetic energy transfer. The rapid forced vortex rotation of the fluid quickly diminishes as one moves further away from the forced tangential flow region. A slight back pressure is created where the forced vortex meets the free vortex region. This back pressure causes the fluid in the inner core to move in a direction opposite to the outer core. Rapid depletion of the rotational energy of the inner core occurs by kinetic energy transfer from the inner core of the vortex to the outer core of the vortex.

A second theory of vortex phenomena proposed here concerns the statistical theory of gases. The Gaussian distribution of velocities of the molecules that comprise the gas is essentially a temperature distribution of the gas molecules. By the free rotation of the vortex downstream of the forced rotation region, a pressure gradient is developed which is maximum at the central axis. A back pressure results within the fluid causing the central denser and cooler core of the fluid to flow backward through the center the outer vortex core.

FIG. 6 provides a schematic illustration of the operation of a vortex valve which is used in certain embodiments of the invention. The valve 10 includes an actuator 12 which displaces the valve within a tubular member 14. By downwardly displacing the actuator 12, the cylindrical end 18 of the valve is displaced from an inlet 16 and air (arrow 20) under pressure is injected into the tube 14 through inlet 16 in a tangential flow. The vortex so created (indicated by the helical arrows) moves upwardly as shown in FIG. 6 toward the hot outlet end 22 of vortex tube. Swirling air near the inner surface of the tube 14 becomes hot as the flow proceeds toward the hot outlet 22 and the hot air leaves through restricted openings 24 in the conical portion 26 of the valve. The restriction at the hot end of the valve imposes enough back pressure on the vortex to force some of the air (arrow 28) to the center of the tube and back through the tube toward the cold outlet end 30. Air 28 becomes very cold as it passes back through the vortex tube and leaves the tube through the cold outlet 30. While the forgoing discussion is in terms of air, it applies equally to any flowing gas.

FIG. 1 illustrates a beverage can of the type that may be used to contain beverages such as beer, soda, coffee, fruit juices and the like. The can 50 includes a conventional end portion 52 and a lid 54. The lid 54 may include a conventional pull top 56 capable of opening a hole for drinking in lid 54 in a conventional manner. In accordance with the invention, the beverage can 50 includes a canister 60 which is immersed in the beverage 62 in the can 50. The canister 60 includes a first chamber 64 containing a compressed gas such as air, carbon dioxide, an air/$CO_2$ mixture, a refrigerant such as a CFC (although these may be environmentally undesirable) or a HCFC (which may be more environmentally safe). The canister further includes an actuator 66 which extends through the lid 54 and cooperates with stem 67 as discussed below. Actuator 66 optionally includes a detente which cooperates with the pull tab and prevents the actuator from being moved until the pull top has been opened. Stem 67 may consist of a tube having openings therein which permit air to pass into and down the center of the vortex as previously explained, or it may take such other structure as is compatible with the operation of the vortex tube as described above. Actuator 66 may consist of a thumb screw which acts downwardly on stem 67 as it is turned. Stem 67 extends coaxially through a tubular member 70 having helical ridges 72 to a hollow cylindrico-conical member 68. A valve 74 rests in a concave recess 77 in the cylindrical surface of member 68. Tubular member 70 empties at one end (the so called "hot end") into an exhaust space 76 from which the hot gas generated in the vortex tube 70 is released. At the other end of tube 70 is an outwardly flared portion 78 from which the cold gas stream generated in the vortex tube 70 is released. The canister further includes at its periphery heat exchange channels 80 formed by an internal cylindrical wall member 81 and an external channel defining wall member 83 which in cooperation form channels 80 which helically circumscribe the outside of the canister 60 and empty into exhaust structure 76 of the canister. Those skilled in the art will appreciate that the channels 80 can assume any design which yields efficient heat transfer between the cold gas stream produced by the vortex tube 70 and the beverage 62. For example, channels 80 may include a plurality of parallel running helical channels each of which has its own inlet opening on the bottom chamber 85.

In operation, the actuator 66 is pressed downwardly or the stem 65 of actuator 66 may be provided with a threaded connection such that by rotating the actuator 66, the actuator pushes the stem 67 downwardly within tube 70.

In its storage condition, i.e., when the canister 60 is not chilling the beverage, the cone valve 74 seals the inlet 84 to the vortex tube 70. The force of the pressurized gas in the chamber 64 on the valve 74 prevents the gas from entering the vortex tube 70. A gas-tight seal is established between conical surface 87 and the outer surface of the tube 70.

Conical valve 74 is opened to allow pressurized gas in chamber 64 to enter the vortex tube 70 by rotating or depressing actuator 66 such that member 68 moves downwardly within tube 70. As element 68 moves downwardly, the cone valve follows concave surface 77 and is moved radially outwardly until flange 86 releases from the edges of the tube 70 and the foot of the valve 74 reaches the cylindrical surface 88 of member 68. In this position, gas in chamber 64 can flow between conical surface 87, flange 86, and the wall of tube 70 and into the vortex tube. The valve 74 and the opening in which it sits can be any convenient size.

The helical ridges 72 within the vortex tube 70 cause the gas entering the tube to spiral between the inside surface of tube 70 and the outside of member 68 thereby creating a vortex. The outwardly flared portion 91 of member 68 assists in preventing the gas from spilling out of the tube 70 into the cold gas exhaust space 78.

Figure 2:
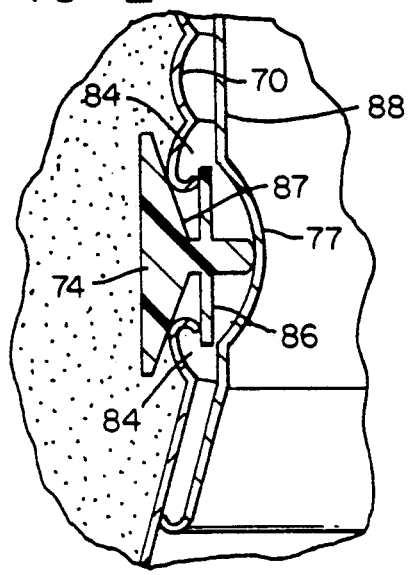
FIG. 2 is a cross-section schematic illustration of a valve means used in the can of FIG. 1 in the closed position.
Figure 3:
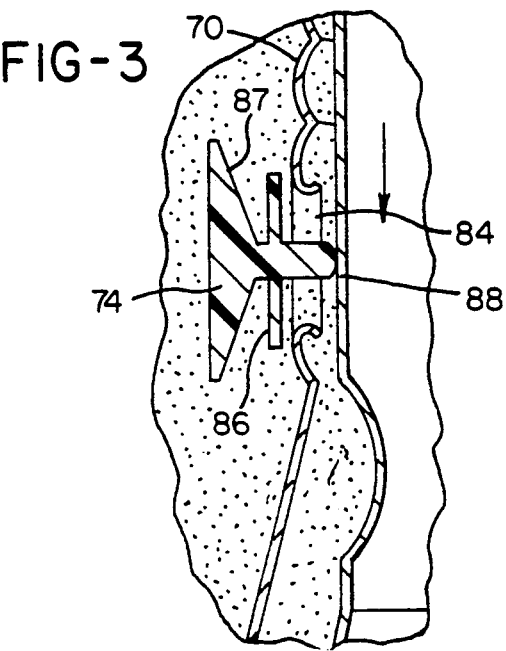
FIG. 3 shows the valve means of FIG. 2 in the open position.

The valve shown in FIGS. 2 and 3, once opened, is permanently locked in an open position so that the gas from the chamber 64 continuously flows into tube 70 without stopping. This mode of operation is useful in applications where the content of the container is chilled or heated in entirety. In another embodiment of this invention, valve 74 is not permanently locked in the activated position, but can spring back freely, allowing pressure to reseal the valve. This mode allows fixed amounts of cooling or fixed portions of beverage to be cooled by finger control of actuator 66. In this embodiment, flange member 86 may engage spring members and include apertures such that gas can pass through the flange member when the valve is opened. On the other hand, by reversing actuator 66, the valve member 74 returns to its seat in recess 76 and prevents gas from entering the vortex tube.

The vortex moves up the tube 70 in a manner analogous to the discussion of FIG. 6. The ability of the vortex tube to establish and sustain a high velocity spiral gas flow is a principal factor in the efficacy of the heat exchange canister. In one embodiment of the invention the tube 70 is about 7 to 10 mm in diameter and about 60 to 75 mm long. The helical ridges are about 3 mm deep and about 0.5 mil (0.01 mm) wide. The exact dimensions of the tube may vary. The helical ridges in tube 70 may be designed to sustain the velocity of the gas between the tube and members 68. For example, the pitch of the ridges may compress as the distance from the gas inlet increases.

The gases near the inner surface of the tube becomes hot as the flow proceeds towards end 76. The hot gases are exhausted through one or more ports in the lid 54. Such a port can be open at all times or it can be sealed initially and opened when the pull top 56 is removed or when the actuator 66 is depressed.

The length of vortex tube 70 creates a back pressure such that a portion of the gas moving up the inside surface of the tube 70 is forced to flow inwardly and back through the tube. This portion of the gas passes into stem 67 and through member 68, which is hollow, and leaves the tube via cold outlet structure 78 from which it flows into the bottom chamber 85 into helical channels 82 whereupon it cools the beverage 62 in contact with the outer surface of canister 60. As the cool gases move through helical channels 82, they warm and are ultimately exhausted into exhaust space 76 at the hot end 75 of vortex tube 70 and they are exhausted through ports in the top of the beverage can.

Figure 4:
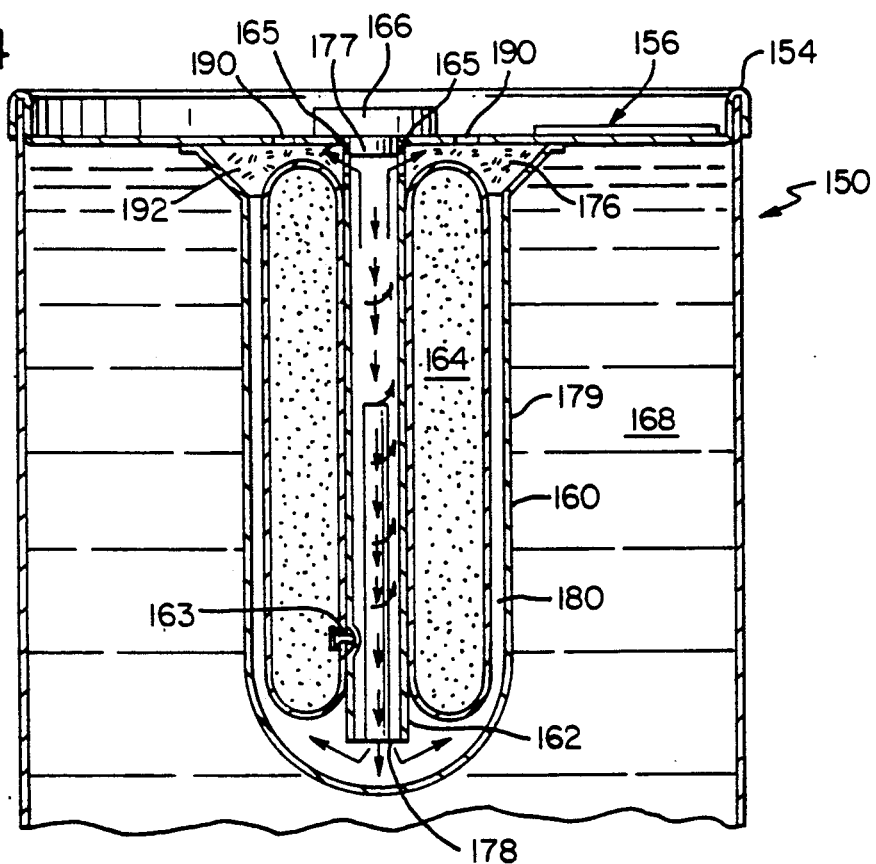
FIG. 4 is a schematic cross-sectional view of a self-chilling container in accordance with another embodiment of the invention.

FIG. 4 illustrates another embodiment of the invention wherein a beverage can 150 is shown having a lid 154 and a pull top 156. A heat exchange canister 160 incorporates a vortex tube 162 in accordance with the present invention. Actuator 166 is pressed downwardly or provided with a screw connection between the actuator and the lid 154 such that rotation of actuator 166 causes the actuator to move downwardly into the heat exchange canister 160. The downward movement of the actuator 166 causes an inlet 163 to be opened between torrid shaped compressed gas canister 164 and vortex tube 162 enabling gas in canister 164 to enter the vortex tube 162 in a tangential flow. The inner tube of the canister 164 is designed to generate a rapid rotation of the gas as it is propelled through the inside of the torus. The warm gas on the outside of the spiral is exhausted from vortex tube 162 through outlets 165 in the upper hot end of the vortex tube 162. A back pressure against the closed end 177 of the vortex tube causes a portion of the gas to flow toward the center of the vortex and to pass back through the tube 162 to the cold outlet 178. The inner core of the vortex field comprising the cold gas is directed to the outlet 178 between the two canisters for cooling the outer shell 179 of the canister which is in intimate communication with the medium to be cooled. From the cold outlet 178, the cold gases pass into the heat exchange chamber 180 where they cool beverage 162 contacting the outside surface 179 of canister 160. Gases from chamber 180 mix with the gases emanating from the hot end of tube 162 in exhaust chamber 176 from which they are exhausted through a port 190. Port 190 can be an open port or it an be opened in the base of lid 154 when the pull top 156 is opened or a separate pull top can be provided or actuator 166 can break a seal and cause a port to be opened in the lid 154 when it is depressed or rotated. In the event that it is desired to use a gas such as an environmentally friendly refrigerant to cool the beverage, a gas absorbing agent or desiccant 192 can be incorporated in chamber 176 to absorb gases emitted from the vortex tube and the heat exchange chamber 180. This way the gas is adsorbed by the gas adsorbing agent without entering the atmosphere.

Figure 5:
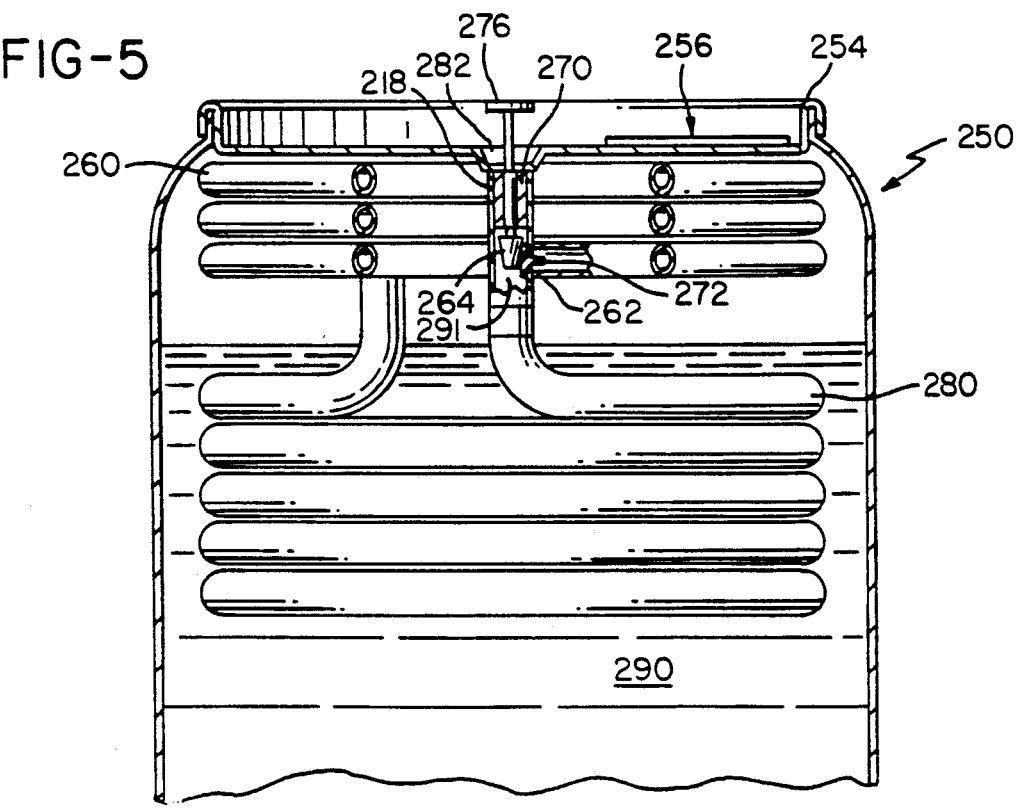
FIG. 5 is a schematic cross-sectional view of a container for heating a food in accordance with still another embodiment of the invention.

FIG. 5 illustrates a further embodiment of the invention wherein a self-heating beverage or food container 250 includes a lid 254 and a pull top 256 as described previously.

A first metal tube 260 sealed at one end contains a compressed gas and is coiled to form a helicoil whose second end 262 communicates with a vortex generating valve 270 via conical valve 272. The valve 270 is designed as shown in FIG. 6 except the actuator is attached to the cold end of the valve. A first end of tube 260 is closed off to form a gas tight seal. The shape and length of the helicoil is determined by the shape and size of the container to be heated or chilled. The second end 262 of tube 260 is temporarily sealed by the action of conical element 264 of vortex valve 270 against cone valve 272. The central axis of cone valve 272 is perpendicular to the central axis of vortex valve 270. The inside surface of end 262 of tube 260 may be slightly contoured to form a positive seal with the conical surface of valve 272. Cone valve 272 may be manufactured with aluminum metal by a stamping process.

In accordance with this embodiment of the invention, the vortex valve 270 is coaxially positioned within one end of a second tube member 280. The vortex valve 270 is displaced axially in FIG. 5 by actuating member 276 which is joined to a hollow cylindrical element 218 at the cold end of the valve. Actuator 276 is hollow and includes openings to permit cold air to escape through element 218 and exhaust port 282 in the container. Upon depression of the actuator 276 with finger pressure, valve 272 is depressed into tube 260. This in turn dislodges the valve 272 from its seat on the inside surface of tube 260 and creates a passageway for compressed air from tube 260 to escape into vortex valve 270. The escaping air which is at a high velocity is introduced into the valve 270 in a tangential direction to the valve. The kinematic motion of the air stream is forced into a rotational flow converting linear energy to rotational energy. The hot gases flow through conical head 265 analogous to head 26 in FIG. 6 and into tube 280 thereby heating the tube 280 and the food or beverage 290 in contact with the heat exchange tube. After passing through tube 280, the gases are exhausted through a port (not shown) in the top of the lid 254. Conical member 264 is hollow and a portion of the gas in tube 280 under the back pressure in tube 280 flows out into the center of valve 270 and back through conical element 264 and out of the valve 270 via gas outlet structure 282. Valve 270 allows the rotational air stream to be propelled down a straight path to the hot output 291. Due to the high pressure build up at this output, a portion of the gas is deflected back through the central axis of the incoming vortex stream to form a counter-flowing stream. The kinetic energy of this stream is quickly depleted by the main outer rotating vortex stream. This causes the inner stream to get very cold, while the outer stream becomes hot. The hot layers form concentric cylinders about the cold layers. The valve 270 collects the cold and hot air into the inner and outer cylinders respectively. By using the thermodynamic cooling effect of the expanding gas to evaporatively cool the heated gas on the hot output, the total heat dissipated in the hot end can be reduced to almost zero.

In the preferred embodiment of this invention, a mixture of compressed air and carbon dioxide (50/50) is used as the heat exchange medium. The gas is stored at a pressure of about 300 to 700 psi. Other gases such as $CO_2$ alone or refrigerants can be used at similar or lower pressures. The heat exchange device will contain enough compressed gas to achieve the desired degree of heating or cooling. For a 12 ounce beverage can, about 75 to 150 ml of compressed gas is used to cool a beverage from room temperate. For any given gas, the volume and pressure of the gas required to produce the desired degree of heating or cooling in the beverage or food can be easily calculated using well known thermodynamic equations.

FIG. 7 illustrates another embodiment of the invention in which a heat exchange canister 300 includes a vessel 304 containing compressed gas which is torroidal in shape and includes a vortex tube 306 in the center of the torroid. The tube 306 is defined by the inside wall 308 of the vessel 304. Chamber 304 includes a gas outlet 310 which feeds a into the base 312 of the tube 306. Gas outlet 310 is sealed by a an O-ring 314. To actuate the valve, a thumb screw 320 is rotated on threads 321 and 323. Screw 320 is coupled to stem 322 such that the stem 322 and the member 324 rotate when the thumb screw 320 is turned and the member translates downward or outwardly in tube 306. The O-ring 314 fits on the bottom end of the member 324. O-ring 314 includes groove 316 therein. When the heat exchanger is not in its cooling mode the outlet 310 is sealed by the O-ring. To activate the vortex tube, the thumb screw is rotated and the O-ring is translated to a point outside of the outlet 310 and the gas is released. Helical ridges 326 about 1.6 mil wide and 1.6 mil deep are provided on the surface of the cylindrical portion of member 324 and cause the gas to spirally flow within the tube 306. As the gas moves up the tube, back pressure in the tube 306 forces the gas toward the middle of the vortex such that it enters an opening 328 in the stem 322 and flows internally back through member 324 and exits outlet structure 326. From outlet 326, the gas flows into the heat exchange chamber 330 formed by the wall 302 and the outer housing of canister 300 at the periphery of the canister. The gas from chamber 330 is exhausted from the canister via an exhaust channel 332 which is opened to chamber 330 when the thumb screw 320 is rotated. This channel 332 opens on an axial channel 334 in the thumb screw 320 and allows the gas to leave the canister. Gas from heat exchange chamber 330 mixes with gas from the hot end of tube 306 which is also exhausted via the axial channel 334.

In accordance with another embodiment of the invention, a canister is provided which simultaneously heats one food item while it cools another. In this embodiment, heat exchange tubes are connected to both the hot end and the cold end of the vortex tube. Upon releasing the compressed gas into the vortex tube, the cold end exhaust can be used to cool one food or beverage item while the hot end exhaust can be used to heat another simultaneously.

Having described the invention in detail and by reference to preferred embodiments thereof, it will be apparent that modifications and variations are possible without departing from the scope of the invention defined in the appended claims.

What is claimed is:

1. A portable heat exchanger for heating or cooling a medium comprising:
   a vessel for containing a discrete quantity of a compressed gas,
   a vortex generating means,
   valve means for controlling the release of said compressed gas from said vessel,
   means for introducing said compressed gas released from said vessel into said vortex generating means, said vortex generating means producing a first stream of gas and a second stream of gas, said first stream of gas having a temperature greater than said second stream,
   heat exchange means receiving one of said first and second streams of gas from said vortex generating means and absorbing heat from or releasing heat to said medium, and
   exhaust means for releasing said streams of gas.

2. The heat exchanger of claim 1 wherein said heat exchanger is for cooling said medium and said heat exchanger receives said second stream of gas from said vortex generating means.

3. The heat exchanger of claim 1 wherein said heat exchanger is for heating said medium and said heat exchange means receives said first stream of gas from said vortex generating means.

4. The heat exchanger of claim 1 wherein said heat exchange means is a helical coil immersed in said medium.

5. The heat exchanger of claim 1 wherein said vortex generating means includes a tubular member having helical ridges therein and having a first end, a second end, and an aperture for introducing a gas into said tubular member, and a hollow cylindrical member coaxially situated within said tubular member having a cylindrical surface adjacent said helical ridges such that a helical space is defined between said tubular member and the surface of said cylindrical member, wherein compressed gas entering said tubular member through said aperture is conducted by said space into a helical flow toward the first end of said member and a first portion of said flowing gas adjacent the inside surface of said tubular member increases in temperature and is exhausted from said first end of said tubular member, said tubular member providing a back pressure such that a second portion of said gas flows to the center of said tubular member and flows back through said tubular member whereupon said gas cools said second portion of said gas being exhausted from said second end of said tubular member.

6. The heat exchanger of claim 5 wherein said vessel containing said compressed gas surrounds said tubular member.

7. The heat exchanger of claim 6 wherein said heat exchange means comprises a channel defining member which cooperates with the outside of said vessel containing said compressed gas to form gas conducting channels which traverse the outside of said vessel.

8. A self-cooling or self-warming container for a food or beverage, said container comprising a first vessel for containing said food or beverage and a heat exchanger for heating or cooling said food or beverage situated within said first vessel, said heat exchanger including a second vessel for containing a compressed gas, a vortex generating means, valve means for controlling the release of said compressed gas from said second vessel, means for introducing compressed gas released from said second vessel into said vortex generating means, said vortex generating means producing a first stream of gas and a second stream of gas, said first stream having a temperature greater than said second stream, heat exchange means for receiving one of said first and second streams of gas from said vortex generating means and absorbing heat from or releasing heat to said food or beverage, and exhaust means for releasing said gas streams from said container.

9. The container of claim 8 wherein said first vessel includes a lid for sealing said food or beverage within said first vessel and said container includes an actuator for said valve means which extends through said lid in operating relation to said valve means.

10. The container of claim 9 wherein said vortex generating means includes a tubular member having helical ridges therein and having a first end, a second end, and an aperture for introducing a gas into said tubular member, and a hollow cylindrical member coaxially situated within said tubular member having a cylindrical surface adjacent said helical ridges such that a helical space is defined between said tubular member and said cylindrical surface; wherein compressed gas entering said tubular member through said aperture is conducted by said space into a helical flow toward the first end of said member and a first portion of said flowing gas adjacent the inside surface of said tubular member increases in temperature and is exhausted from said first end of said tubular member, said tubular member providing a back pressure such that a second portion of said gas flows to the center of said tubular member and flows back through said tubular member, whereupon said gas cools said second portion of said gas being exhausted from said second end of said tubular member.

11. The container of claim 10 wherein said container is a self-cooling container and said heat exchange means receives said second portion of said gas from said second end of said tubular member.

12. The container of claim 11 wherein said container is for a beverage and said heat exchanger is immersed in said beverage.

13. The container of claim 11 wherein said vessel for said compressed gas is a cylindrical vessel surrounding said tubular member.

14. The container of claim 13 wherein said heat exchange means comprises a channel defining member which cooperates with the outside surface of said vessel for said compressed gas to form gas conducting channels which traverse the outside of said vessel.

15. A heat exchange canister for heating or cooling a food or beverage comprising:
a tubular vortex generating means centrally positioned in a housing defining said canister,
a first chamber surrounding said vortex generating means containing a discrete quantity of a compressed gas,
valve means for controlling the release of said compressed gas from said first chamber and for introducing said compressed gas into said vortex generating means,
a second chamber defined by the inside wall of said housing receiving a stream of gas from said vortex generating means whereby said gas absorbs heat from or transfers heat to said housing, and exhaust means for releasing gas from said housing.

16. The heat exchanger of claim 1 further including a second heat exchange means for receiving the other of said first and second streams such that said heat exchanger is useful to simultaneously heat and cool a first and second medium.

* * * * *